United States Patent
Bremer et al.

(10) Patent No.: US 7,020,266 B2
(45) Date of Patent: Mar. 28, 2006

(54) SIMULTANEOUS TRANSMISSION OF AN ANALOG POTS SIGNAL AND A DIGITAL SIGNAL ON A SUBSCRIBER LINE

(75) Inventors: Gordon Bremer, Clearwater, FL (US); Jeff Davis, Indian Rocks Beach, FL (US)

(73) Assignee: Paradyne Corporation, Largo, FL (US)

( * ) Notice: Subject to any disclaimer, the term of this patent is extended or adjusted under 35 U.S.C. 154(b) by 16 days.

(21) Appl. No.: 10/269,209

(22) Filed: Oct. 3, 2002

(65) Prior Publication Data

US 2003/0039348 A1 Feb. 27, 2003

Related U.S. Application Data

(63) Continuation of application No. 09/032,671, filed on Feb. 27, 1998
(60) Provisional application No. 60/039,265, filed on Feb. 28, 1997.

(51) Int. Cl.
*H04M 1/64* (2006.01)
*H04M 7/00* (2006.01)
*H04M 1/00* (2006.01)

(52) U.S. Cl. ............................ 379/220.01; 379/221.01; 379/221.02; 379/88.13; 379/93.09; 379/93.08; 379/373.01; 379/373.05

(58) Field of Classification Search ................. 379/37, 379/47, 49, 74, 88.13, 88.17, 92.01, 93.03, 379/92.02, 93.08, 93.09, 93.11, 219, 220.01, 379/221.02, 373.01, 373.05
See application file for complete search history.

(56) References Cited

U.S. PATENT DOCUMENTS

| | | | |
|---|---|---|---|
| 4,258,433 A | 3/1981 | Herschtal et al. ............. | 370/24 |
| 4,335,464 A | 6/1982 | Armstrong ................... | 375/43 |
| 4,494,138 A | 1/1985 | Shimp .......................... | 358/86 |
| 4,630,287 A | 12/1986 | Armstrong ................... | 375/39 |
| 4,811,357 A | 3/1989 | Betts et al. .................... | 375/1 |
| 4,860,379 A | 8/1989 | Schoeneberger et al. ...... | 455/5 |
| 4,866,758 A | 9/1989 | Heinzelmann ............... | 379/94 |
| 5,086,385 A * | 2/1992 | Launey et al. ................ | 700/83 |
| 5,099,478 A | 3/1992 | Bremer et al. .......... | 370/100.1 |
| 5,111,497 A | 5/1992 | Bliven et al. ................. | 379/27 |
| 5,140,630 A | 8/1992 | Fry et al. .................... | 379/179 |

(Continued)

OTHER PUBLICATIONS

Harry Newton, Newton's Telecom Dictionary, Feb. 2000, Telecom Books, 16th Edition.*

"Network and Customer Installation Interfaces —Asymmetric Digital Subscriber Line (ADSL) Metallic Interface," American National Standards Institute (ANSI) T1.413, 1995.

Article entitled "Multicarrier Modulation for Data Transmission: An Idea Whose Time Has Come" by John A.C. Bingham, May 1990 –IEEE Communications Magazine, pp. 5–14.

*Primary Examiner*—Allan Hoosain
(74) *Attorney, Agent, or Firm*—Thomas, Kayden, Horstemeyer & Risley

(57) ABSTRACT

Apparatus and method for simultaneously providing multiple telephone-type services to any/all POTS-type devices on a single wire pair at a user premises. The present invention provides for the ability to add separately addressable POTS devices on a single service loop. This can be accomplished in at least two ways: first by the use of a multipoint protocol or second by Frequency Division Multiplexing.

63 Claims, 8 Drawing Sheets

U.S. PATENT DOCUMENTS

| | | | |
|---|---|---|---|
| 5,214,650 A | 5/1993 | Renner et al. | 370/110.1 |
| 5,247,347 A * | 9/1993 | Litteral et al. | 725/114 |
| 5,253,058 A * | 10/1993 | Gharavi | 375/240.12 |
| 5,327,423 A | 7/1994 | Audouin et al. | 370/76 |
| 5,341,474 A | 8/1994 | Gelman et al. | 395/200 |
| 5,347,304 A | 9/1994 | Moura et al. | 348/12 |
| 5,365,264 A | 11/1994 | Inoue et al. | 348/10 |
| 5,371,532 A | 12/1994 | Gelman et al. | 348/7 |
| 5,400,322 A | 3/1995 | Hunt et al. | 370/468 |
| 5,408,260 A | 4/1995 | Arnon | 348/6 |
| 5,459,729 A | 10/1995 | Bliven | 370/112 |
| 5,461,616 A | 10/1995 | Suzuki | 370/79 |
| 5,488,412 A | 1/1996 | Majeti et al. | 348/10 |
| 5,586,121 A | 12/1996 | Moura et al. | 370/404 |
| 5,592,470 A | 1/1997 | Rudrapatna et al. | 370/320 |
| 5,594,491 A | 1/1997 | Hodge et al. | 378/7 |
| 5,594,726 A | 1/1997 | Thompson et al. | 370/485 |
| 5,610,910 A * | 3/1997 | Focsaneanu et al. | 370/351 |
| 5,613,190 A | 3/1997 | Hylton | 455/3.1 |
| 5,625,405 A | 4/1997 | DuLac et al. | 348/7 |
| 5,740,384 A * | 4/1998 | Asthana et al. | 710/305 |
| 5,756,280 A | 5/1998 | Soora et al. | 455/4.2 |
| 5,781,617 A * | 7/1998 | McHale et al. | 379/93.14 |
| 5,781,728 A * | 7/1998 | Rybicki et al. | 709/230 |
| 5,910,970 A * | 6/1999 | Lu | 375/377 |
| 5,926,572 A * | 7/1999 | Kim et al. | 382/238 |
| 6,061,357 A * | 5/2000 | Olshansky et al. | 370/401 |
| 6,137,839 A * | 10/2000 | Mannering et al. | 375/260 |
| 6,243,394 B1 * | 6/2001 | Deng | 370/466 |
| 6,580,785 B1 * | 6/2003 | Bremer et al. | 379/88.13 |

* cited by examiner

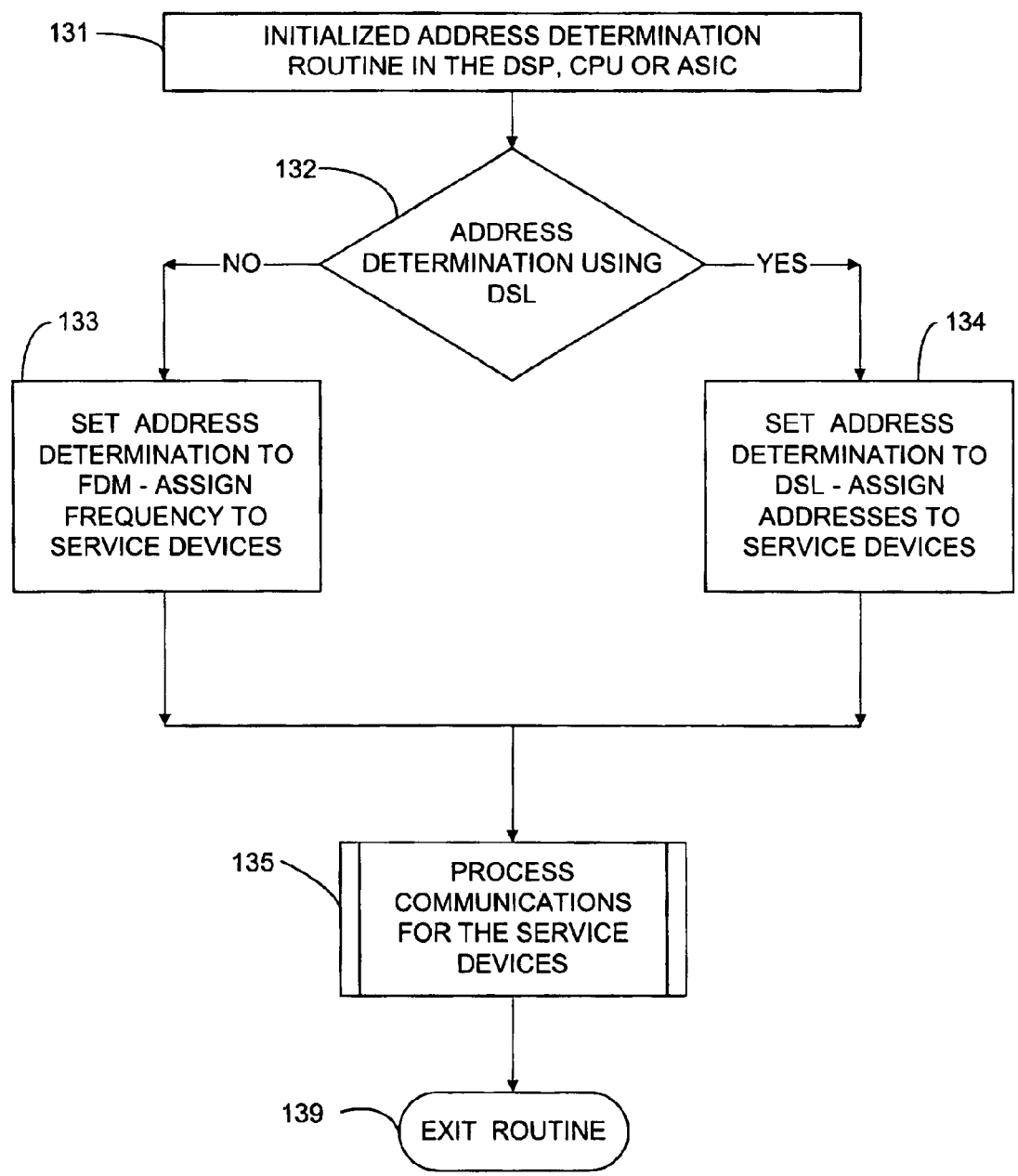

SIMULTANEOUS TRANSMISSION OF AN ANALOG POTS SIGNAL AND A DIGITAL SIGNAL ON A SUBSCRIBER LINE

RELATED APPLICATIONS

This application is a continuation of U.S. patent application Ser. No. 09/032,671, filed on Feb. 27, 1998, which claims priority under 35 U.S.C. 119(e) to provisional application Ser. No. 60/039,265, filed Feb. 28, 1997.

BACKGROUND OF THE INVENTION

1. Field of the Invention

The present invention generally relates to an apparatus and method for enabling a plurality of analog and digital sets of services that can be utilized simultaneously on a single telephone line.

2. Description of the Related Art

Presently, telephone companies can offer only one set of analog services to any and all POTS-type devices on each subscriber line wire pair at the premise, because current POTS service requires one (1) line per POTS service set. This is because device types are mutually exclusive, and consequently only one device type can utilize the service line at any one time (i.e. one active telephone, or a single fax operation at a time). A further limitation exists for the telephones, such that all extensions are connected to the same conversation. Presently if multiple sets of services are desired, an additional line is required for each additional set of services. This is most evident in situations like a second loop for a fax machine or a "teen line" to separate parent telephone calls from those of children in a household. There are added costs for each additional line.

Also, telephone companies today cannot command any additional service revenue from the usage of extra phones, modems, and fax operations on a single line. Until now, from the usage of extra phones, modems, and fax operations on a single line. Until now, telephone companies could not offer any extra beneficial sets of service to the premise on a single line. Accordingly, there is a need to develop an apparatus and method to transmit a plurality of data signals in parallel with the analog POTS signal, thereby providing multiple telephone-type sets of services on a single telephone line.

With such an apparatus and method for enabling simultaneous multiple sets of telephone-type services on a single telephone line, the telephone companies can offer numerous sets of services to any/all devices on each wire pair at the premise.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentality's and combinations particularly pointed out in the appended claims.

To achieve the advantages and novel features, the present invention is generally directed to a data communications apparatus and method that allows a user to utilize simultaneously multiple telephone-type services to any/all POTS-type devices on each wire pair at the premise. The present invention provides for the ability to add separately addressable POTS devices on a single service loop. This can be accomplished in at least two ways: first by the use of a multipoint protocol or second by Frequency Division Multiplexing.

One embodiment of the present invention accomplishes this by using a multipoint protocol and providing each premises device with a unique device ID that is separately addressable.

Another embodiment of the present invention accomplishes this by using the frequency division multiplexing (FDM) method, that utilizes a device that assigns an available frequency range, within the bandwidth of the communication medium, for each device that is separately addressable.

Another embodiment of the present invention accomplishes this by using the time division multiplexing (TDM) method, that combines separate signals (i.e. analog and digital) into a single high-speed data transmission in which the transmission time is broken into segments. Each segment carries one element of one signal. The separate signals are sampled in order at regular intervals that are then combined in the single high-speed signal. Each time period is then assigned for each device that is separately addressable. The above TDM technique does not provide simultaneous access via connection to phone jacks. The modem apparatus used in this embodiment includes a memory containing a plurality of program routine sequences and a processor that performs the selected program routine sequences to enable the simultaneous multiple access techniques disclosed by the modem described in commonly assigned and co-pending U.S. patent application (entitled, "APPARATUS AND METHOD FOR COMMUNICATING VOICE AND DATA BETWEEN A CUSTOMER PREMISES AND A CENTRAL OFFICE", Ser. No. 08/962,796, filed on Nov. 3, 1997, herein incorporated by reference, and the modem described in commonly assigned and co-pending U.S. patent application entitled "APPARATUS AND METHOD FOR A MULTIPOINT DSL MODEM", Ser. No. 09/031,226, filed on, Feb. 26, 1998, herein incorporated by reference.

BRIEF DESCRIPTION OF THE DRAWINGS

The accompanying drawings incorporated in and forming a part of the specification illustrate several aspects of the present invention, and together with the description, serve to explain the principles of the invention. In the drawings:

FIG. 10 is a flow chart of the process for the initializing the address determination routines residing in the DSP, CPU or ASIC device of FIG. 4.

Figure 1:
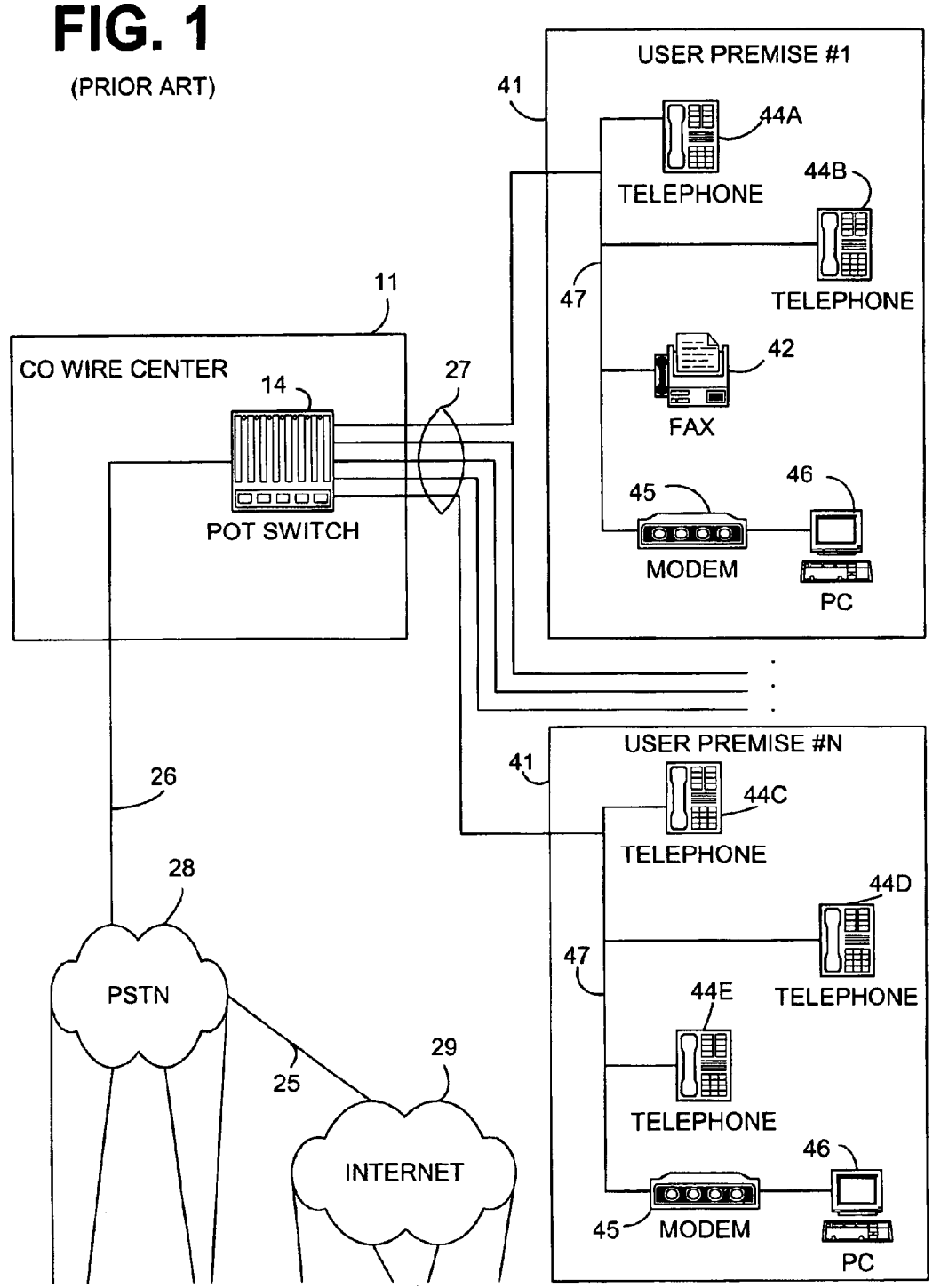
FIG. 1 is a view of the central office (CO) wire centers and user premises layout of the prior art.

Reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications, and equivalents included within the spirit and scope of the invention as defined by the appended claims.

DETAILED DESCRIPTION OF THE PREFERRED EMBODIMENT

Referring now in detail to the drawings in which the reference numerals indicate like parts throughout several views, FIG. 1 illustrates the plain old telephone system (POTS) networks including dial data communication modems (45) of the prior art. The POTS network includes numerous user premises 41, wherein each user premises is connected to a central office wire center 11, via a subscriber line 27. Each subscriber line 27 is connected to the user premises 41, which further connects to a user premises line 47, for distribution of POTS service throughout the user premises. Usually, there are numerous POTS devices connected to each user premises line 47, such as telephones 44, fax machines 42, personal computers (PCs) 46, and the like. It is also known, (but not shown), that it is possible to have multiple subscriber lines 27 connected to each user premises, thereby creating two separate user premises lines 47 within each user premises as previously discussed.

As noted previously, each user premises is connected, via a subscriber line 27, to a central office wire center 11. The subscriber line 27 is connected to a POTS switch 14 that routes all POTS signals, including both those to/from analog devices such as telephones and to/from digital data devices such as dial modems or fax machines. The POTS signals are sent from the POTS switch 14 to the other central office wire centers and to remote premises and to data services such as the Internet services via the public switch telephone network (PSTN) 28. The CO wire center 11 thus can offer only a single telephone number and only one set of services for each subscriber line 27.

A brief discussion of an example for the analog signals generated in the applied system environment for the prior art from the user premises and transmitted through the central office wire center, via the PSTN, and back to a user premises will now be detailed.

When a user wishes to place a telephone call on device 44, the user picks up the receiver and puts the subscriber line 27 in an off-hook condition, that is detected at the central office wire center 11, by closed switch hooks (not shown). The off-hook condition signals the central office wire center 11, via subscriber line 27, to accept call request by allowing a flow of D.C. current and a dial tone of 480 Hz to be sent to device 44. The outgoing telephone call signals are transmitted, as described before, via subscriber line 27 to POTS switch 14. The analog POTS system signals are transmitted, via the PSTN 28, to the destination central office wire center 11 of the destination user premises 41. The signal is further directed towards a POTS switch 14 within the destination central office wire center 11. The signal is transmitted, via subscriber line 27, to the destination user premises 41. This is the path in which a POTS call is transmitted.

Now, a description of digital signals to/from the user premises will be described. When a user desires to communicate data over a digital network via his personal PC 46 or the like, the dial modem 45 puts subscriber line 27 in an off-hook condition, that is detected at the central office wire center 11, by closed switch hooks (not shown). The off-hook condition signals the central office wire center 11, via subscriber line 27, to accept an outgoing call by allowing a flow of D.C. current and a dial tone of 480 Hz to be sent to device 44. Digital signals from the digital device are transformed into analog signals by dial modem 45. The signals are transmitted via the PSTN 28 to destination user premises 41 in the same manner as the analog signals in the aforementioned example. The signals may alternatively be routed to the Internet 29 via an Internet Service provider to provide access to Internet data.

Figure 2:
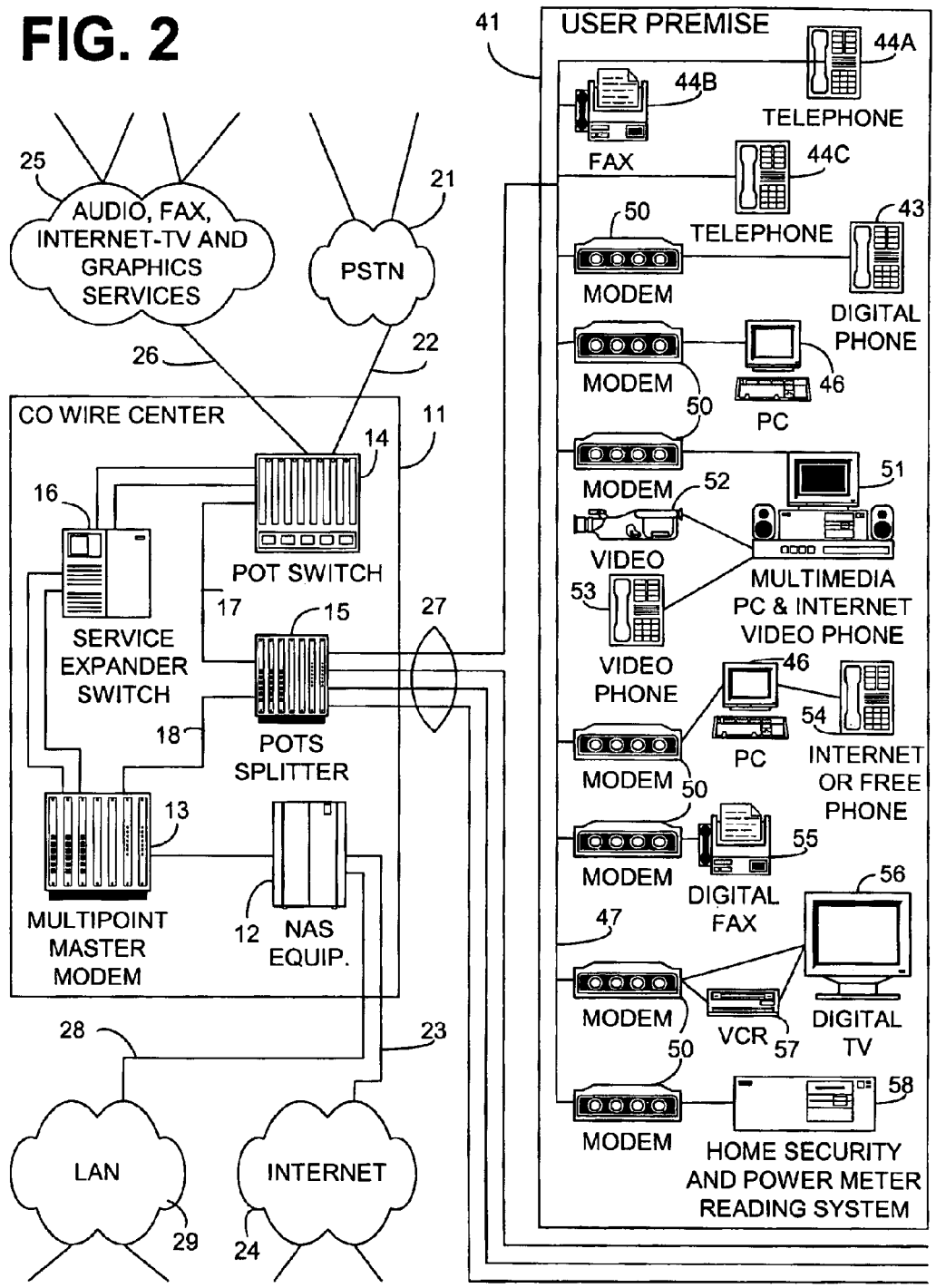
FIG. 2 is a view of the CO wire centers and user premises layout of the present invention, with many of the multiple telephone-type services depicted.

FIG. 2 illustrates the plain old telephone system (POTS) networks including data communication DSL modems 13 and 50 of the preferred embodiment. The data communication DSL modems 50 include the apparatus and methods for enabling the simultaneous multiple telephone type services on a single line. FIG. 2 illustrates that a variety of services may be connected at the CO wire center 11 in accordance with the present invention. These services may include digital telephone services, Internet television, audio and multimedia, fax, graphic services, high-speed Internet services, high-speed land services, Internet telephone service, stereo/audio service, power meter reading, home management and security services. Again, the operation of such services are generally understood and are further not necessary in order to describe the operation of the present invention. As further illustrated in FIG. 2, the prior POTS voice devices of the prior art telephone 44 and standard fax machine 42, establish communications on the frequency band between 0 kHz and about 4 kHz. A second transmission frequency band is defined at a higher frequency level than the POTS frequency band and is used in the transmission of digital subscriber line (DSL) communications that provides multiple access techniques of the preferred embodiment. The DSL modems 50 provide both the physical layer and higher layer functions as needed to provide the simultaneous multiple access. Other methods of providing multiple access, such as frequency division multiplexing or other multiplexing techniques, may be utilized with some limitation in overall performance. The different equipment devices at the user premises can be identified and accessed by a multiple access code (MAC) address as determined by the DSL modem 50, or by the assigned available frequency range within the bandwidth of the communication. Now the different types of services will be described with regard to FIG. 2.

For audio services, the modem 50 can be coupled with audio compression for a telephone or stereo receiver as shown by device 51.

Digital phone 43 utilizes modem 50 to digitize an audio buffer as necessary and transmits the digitized audio at an average data rate of 8 KPS and performs a reverse function in the received direction. Thus, the digital phone acts to the user as a telephone with digital clarity and services provided. The digital phone may communicate over PSTN via compatible analog digital conversions in the optional Teleco switch expander 16.

The PC 46 may transmit and receive data via DSL modem 50 from the Internet or local area network (LAN) or other point to point type data transmissions.

Multimedia and video telephone service can be provided utilizing video camera 52 to capture video, the video telephone 53 which may be a microphone and multimedia PC Internet video phone device 51, which captures video and audio and provides the digitized information to modem 50 for transmission to the destination user. The Internet video phone may use either the PSTN or Internet or other land-type network for data communications. Internet phone 54 has the features of the digital phone with a protocol required for communication over Internet or land networks.

Digital faxes can be transmitted and received via the digital fax device 55 through modem 50 which would digitize the information and transmit it via the Internet land or PSTN networks.

Digital television 56 and digital video cassette recorder (VCR) 57 can be utilized with the Internet streaming to receive and record Internet television and audio/visual data streaming. Services that require low-delay and medium delay (latency) utilize the "quality of service" polling techniques to assure that real-time applications are serviced in a timely manner. The "quality of service" polling techniques are disclosed by the modem described in commonly assigned and co-pending U.S. patent application entitled "APPARATUS AND METHOD FOR DSP SHARING USING STATISTICAL PROPERTIES OF DATA", Ser. No. 09/027,705, filed on Feb. 23, 1998, herein incorporated by reference.

The home security and power meter reading system device 58 provides monitoring and controlling of various home functions such as a security system. It also provides the ability for communicating home functions data to a local utility such as gas usage, electricity usage, water usage, and the like.

All the unique service devices as shown and described with regard to FIG. 2, are accessed via unique addresses. For each particular telephone company service provided, that service provides the user a unique address or frequency range for each new service premise device. Thus, those and only those unique service devices are enabled.

Each of the additional service devices illustrated in FIG. 2 are connected to the user premise line 47. This user premise line is further connected to one subscriber loop 27 that connects to the CO wire center 11. The signals from each of the service devices are modulated via modem 50 and input to the CO wire center plain old telephone system ("POTS") splitter 15 which separates the POTS communications that are now transmitted in the frequency band between 1 kHz and 4 kHz. These POTS signals are identified in POTS splitter 15 and separated from the multiple service signals operating at a higher frequency at POTS splitter 15. The POTS voice signals are separated from the data signals and transmitted to POTS switch 14 for communications over the PSTN or WEB TV, audio, fax, graphic services, home security and power meter reading networks 25. The LAN data signals and Internet data signals are separated from the voice POTS signals in POTS splitter 15 and forwarded on the master point modem 13 for further transmission through the NAS equipment devices 12 to the Internet 24 and other LAN networks 29.

Service signals from the digital phone multimedia Web TV, digital fax, home security and power meter reading systems are provided to the multipoint master modem 13 by the POTS splitter 15. These signals are forwarded on to the service expander switch 16 for further transmission through the POTS switch 14 on communication link 26 to the Web TV, audio, fax, graphic services, digital TV, Internet phone and the like network 25. The digital phone and Internet and free phone each may have a standard telephone number or may share a number with the other devices. The digital phone and Internet or free phone would have standard Teleco POTS features and billing. The free phone 54 would have a different multiple access code and would permit free long distance calls on the Internet 24.

Figure 3A:
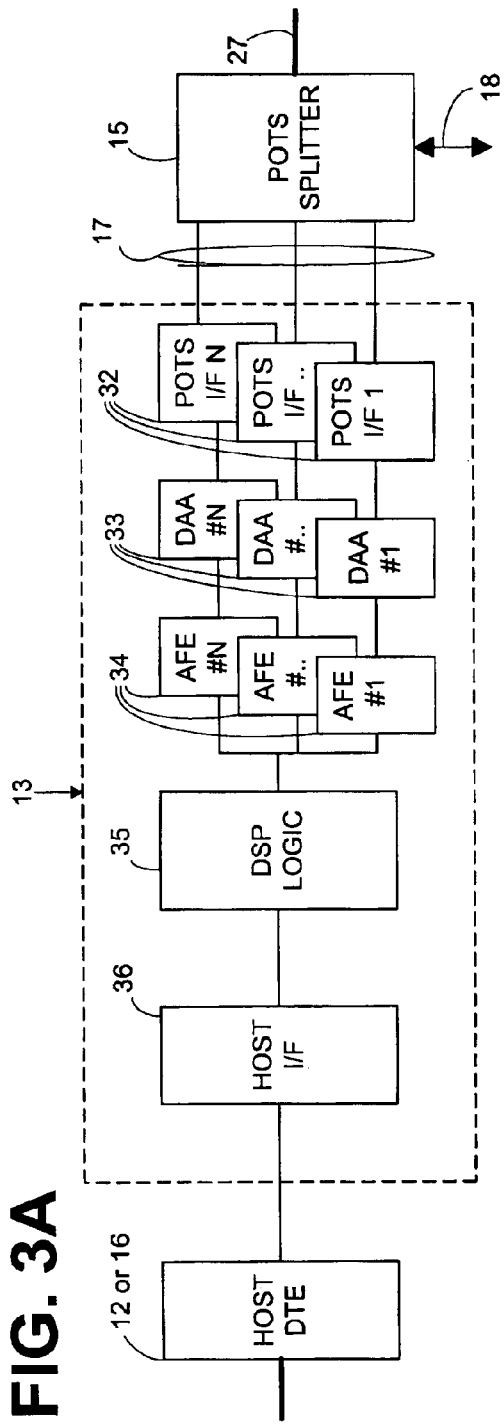
FIG. 3A is a block diagram of the CO POTS interface and modem apparatuses of FIG. 2.

FIG. 3A is a block diagram of the CO wire center multichannel data communications device modem (modem 13) constructed in accordance with the present invention. The typical configuration of the central wire office 11 multichannel data communication device 13 is connected, via a POTS splitter 15, to the subscriber line 27. The analog signals output from POTS splitter 15 into the central office multichannel data communications device 13, are connected through communication links into the POTS interface 32. The central office multichannel data communications device 13 provides for multiple analog lines to be input and converted to digital signals, due to the efficiency of the processor 35 within the central office multichannel data communication device 13. Because multiple analog input lines are permitted, device 13 may require multiples of the analog POTS interface hardware 32, dial access arrangement (DAA) logic 33 and analog front end (AFE) logic 34.

The analog POTS interface hardware 32 connects analog signal line to the dial access arrangement (DAA) logic 33. The dial access arrangement (DAA) logic 33 provides surge protection and impedance matching. Line protection circuit (not shown) protects the multichannel communications device 13 against line surges, lightning strikes, and the like. Line protection circuit (not shown) is then further connected to the impedance and isolation circuit (not shown), via a communication link. The impedance and isolation circuit (not shown) also contains circuitry (not shown) to detect ring indicator on off-hook conditions.

The impedance and isolation circuit is comprised of an impedance matching circuit (not shown) before being connected to the two-to-four wire hyped interface (not shown). The dial access arrangement (DAA) logic 33 connects the analog signals to the AFE logic 34, via a communication link.

The analog front end (AFE) logic 34 converts the analog signal to a digital data signal. The AFE 34 is connected to a communication link which is connected to a receiver (not shown). The receiver receives the analog signals and converts the analog signal by using an analog-to-digital converter. A driver (not shown) drives the signals across a communication link to the impedance and isolation circuit (not shown) of DAA 33, after receiving signals from the driver's digital-to-analog converter (not shown). The receiver analog-to-digital converter (not shown) and driver digital-to-analog converter (not shown) are both connected to the bi-directional digital communication link. Ring indicator and off-hook conditions are processed in ring indicator (RI) off-hook (OH) impedance controller (not shown).

The AFE logic 34 transmits the digital signal to the DSP logic 25 for reconstruction of the digital data. Multiple analog front ends logic 34 may be connected to a single DSP, CPU, ASIC or other processor logic 35, due to the high processing speed of such processor logic.

In alternative embodiments of the invention, the multiple dial access arrangements (DAA) logic 33 and analog front ends logic 34 are not necessary to practice the present invention, and it may be omitted in some applications where the dial access arrangement (DAA) logic 33 and analog front end logic 34 are shared between numerous analog POTS interface hardware 32.

DSP logic 35 reconstructs the digital signal streams into usable digital data by stripping error control information, data compression and the like added by the far-end modem. The reconstructed digital data is transmitted from the DSP logic 35 through the host interface 36 to the host DTE 12 or 16 devices for further transmission over the PSTN 21, Internet 24, LAN 29 or other services network 25.

Figure 3B:
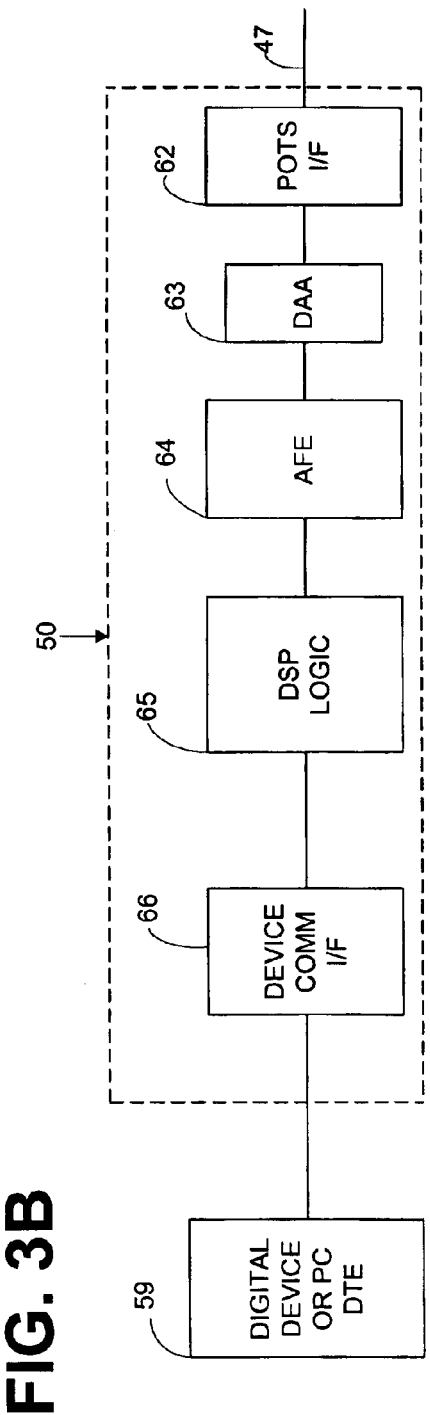
FIG. 3B is a block diagram of the user premises POTS interface and modem apparatuses of FIG. 2.

FIG. 3B is a block diagram of the single POTS line multichannel data communication device (modem 50) constructed in accordance with the present invention. The multichannel data communication device, modem 50, is substantially similar to the CO wire center multichannel data communication device 13, defined in FIG. 3A., except that device 50 is configured to accept only one POTS line connection.

In the typical configuration, the user premises line 47 is connected to line jack POTS interface 62. The line jack POTS interface 62 is connected to dial access arrangement interface 63, analog front end 64, digital signal processor logic 65, and the device communications interface 66, as described in 3A above as item 36. The digital signal processor logic 65 is connected to the host by a local IF bus via a communication line, through the data terminal equipment (DTE) interface 66, which connects to a device such as a fax, digital phone, personal computer (PC), or the like.

Communications device 50 can be for example but not limited to, a data service unit (DSU), modem, or any other communication device capable of frame relay communication. In the preferred embodiment, communication device 50 is a DSU, which contains proprietary address determination logic 50. Central office location 11 is typically the local telephone company's local exchange office which connects via copper wire pair 27 to a remote customer location 41, which can be, for example, a residential or business location.

Figure 4:
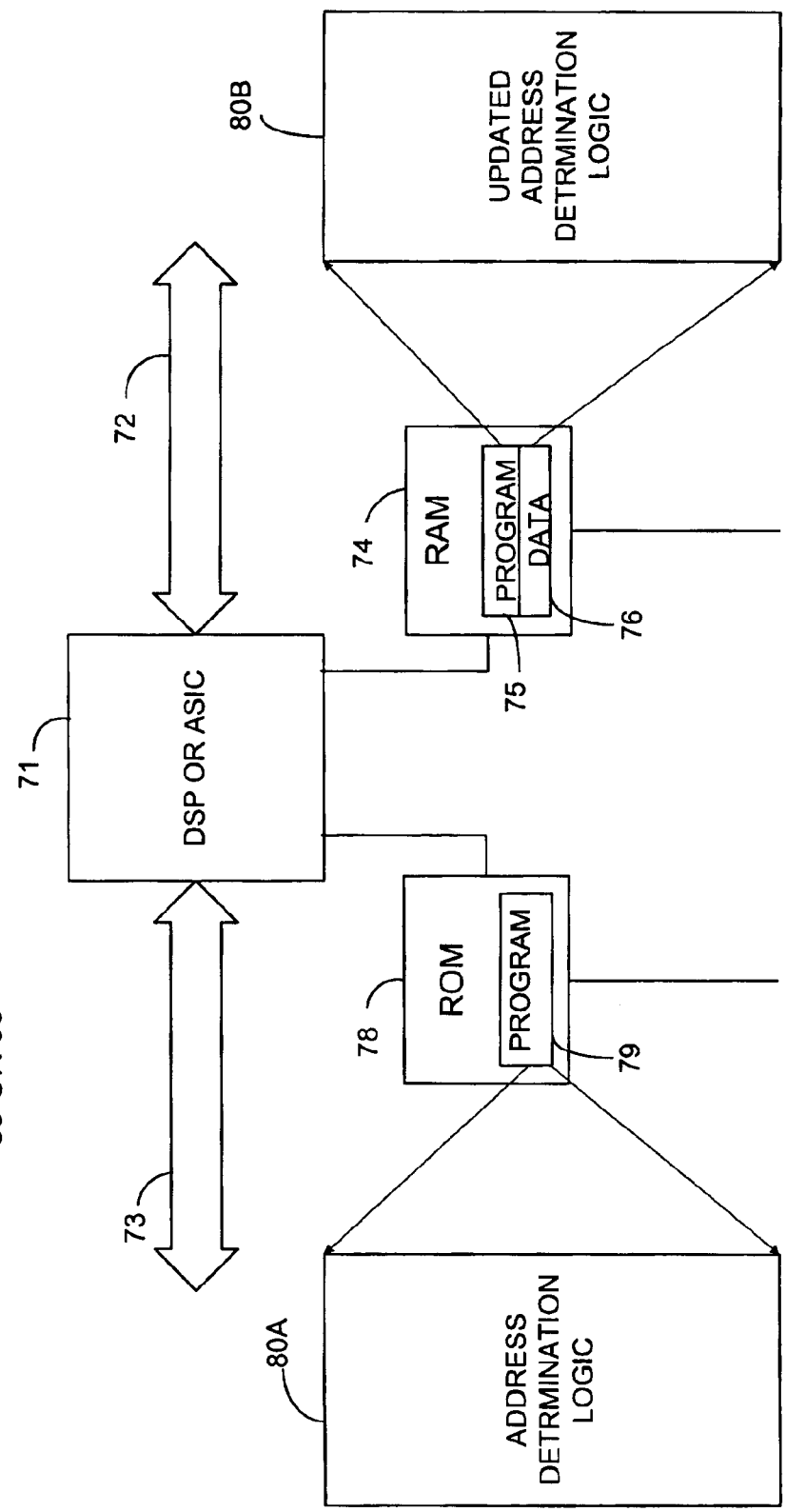
FIG. 4 is a block diagram of the digital signal processor engine of FIGS. 3A and 3B.

As shown in FIG. 4, the digital communication link 72 is connected to the digital signal processor engine 35 or 65, herein referred to as 65, which includes a digital signal processor (DSP) or application specific integrated circuit (ASIC) chip 71, which is connected to read only memory (ROM) 78 and random access memory (RAM) 74. ROM 78 can be comprised of either regular ROM or RAM memory, flash memories, erasable programmable read only memory (EPROMs), electrically erasable programmable read only memory (EEPROMs), or other suitable program storage memories. RAM memory 74 can be comprised of static or dynamic RAM, EEPROM, or other suitable data storage memories.

In the first embodiment, the address determination routines 80A are in the digital signal processor engine 65 program ROM 79. Address determination routines can be downloaded from digital devices, usually a PC connected to the DTE interface 66 (FIG. 3B), into the digital signal processor engine 65 program RAM 75 program area 80B. It is in this way that an updated routine may be downloaded to the modem apparatus to update the address determination routines.

The incoming signals on digital line 72 are input into the DSP engine 71 for processing. Control signals and digital input/output signals are communicated across digital communication link 73. Digital communication links 72 and 73 can be comprised of 8, 16, 32, 64, 128 or other bit sized digital parallel communication links. Communication links 72 and 73 can also be comprised of bit serial or other types of chip-to-chip signal communication links. The DSP or ASIC 71 of the digital signal processor engine 65 is connected, via communication link 73 interface 36 or 66 as illustrated in FIGS. 3A and 3B.

Figure 5:
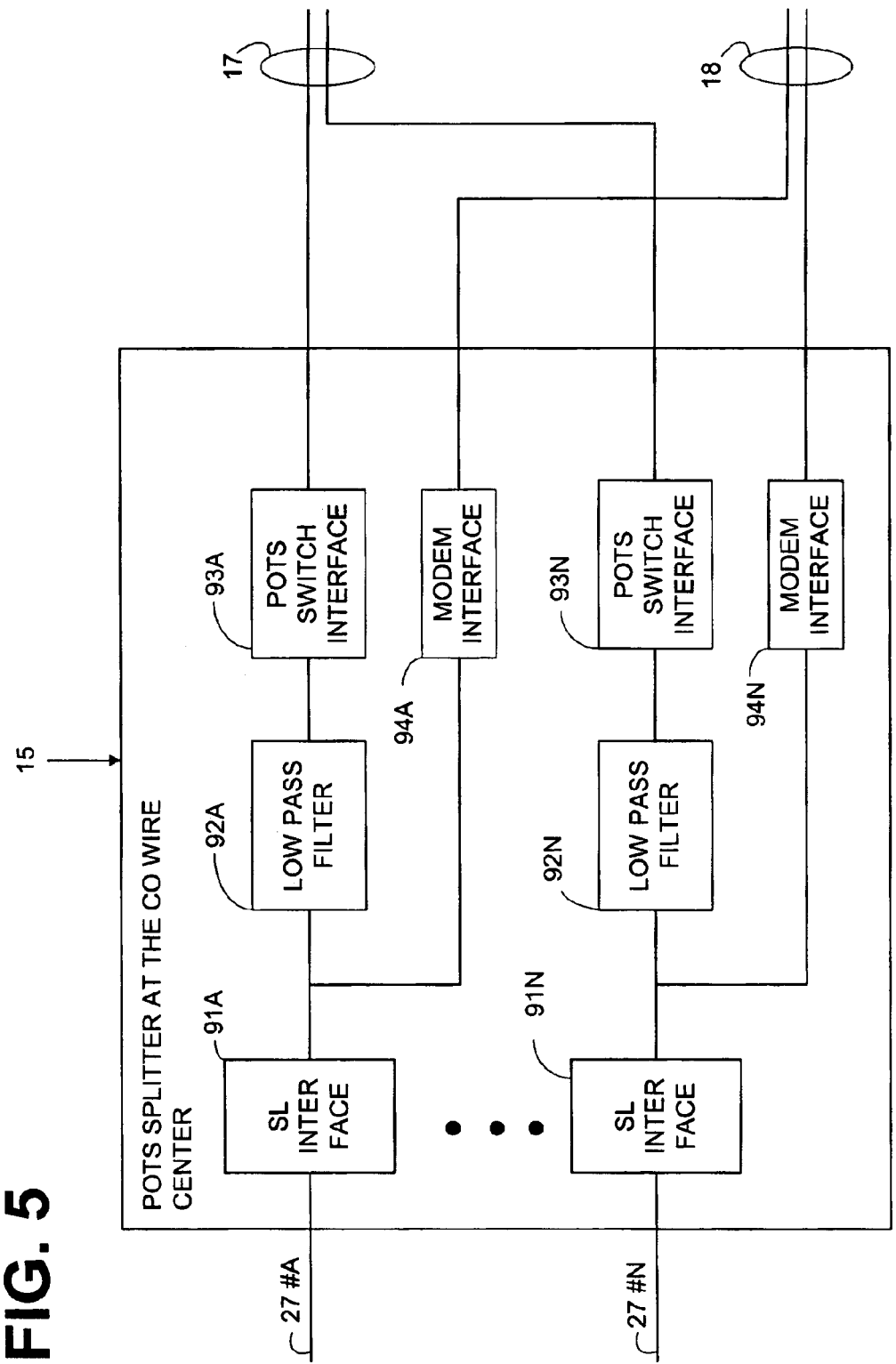
FIG. 5 is a block diagram of the CO POTS and digital signals splitter of FIG. 2.

Referring to FIG. 5, which is a block diagram of the POTS splitter 15 at the central office wire center 11. The POTS splitter has numerous subscriber line interfaces 91I–91N that are connected to subscriber lines 27A–27N. The POTS splitter 15 accepts analog signals across subscriber line 27A–27N, conducts the analog signal through low pass filter 92 for transmission to the POTS switch interface 93. The POTS switch then transmits analog signals across communication link 17 to the POTS switch 14. The analog signals received from subscriber line interface 71 are also transmitted through modem interface 94, which transmits the data communication traffic, via communication link 18, to the master modem 13.

Figure 6:
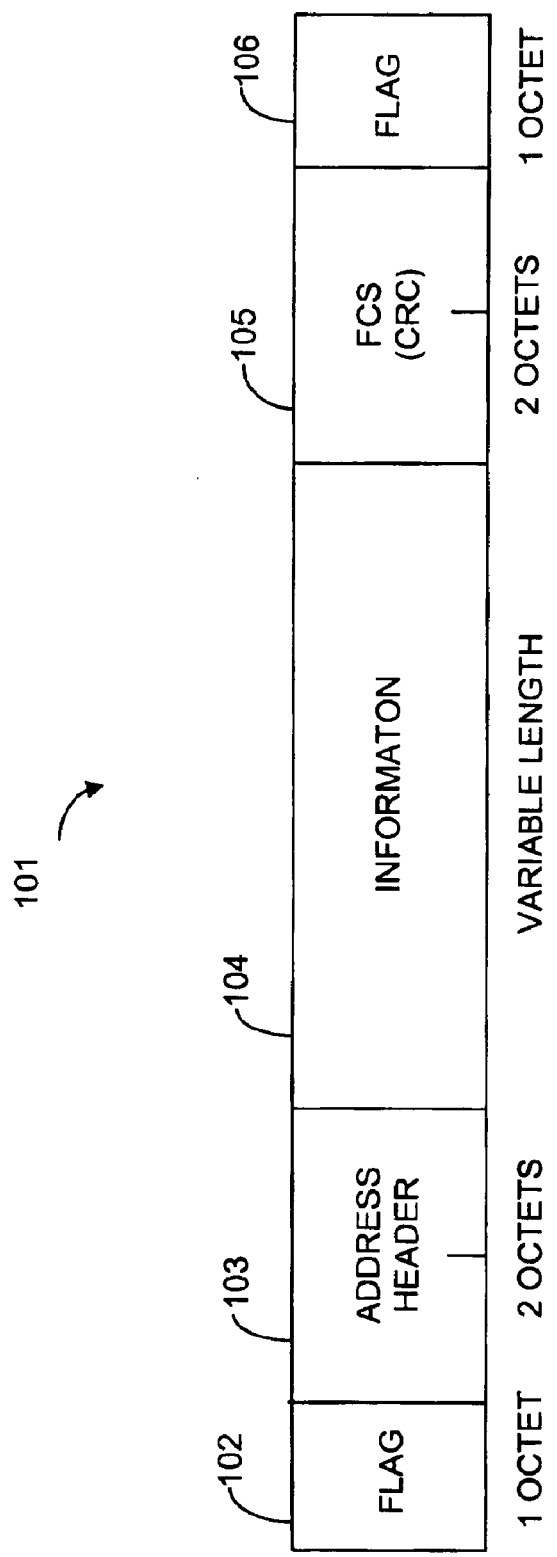
FIG. 6 is a block diagram of the packet using the multipoint protocol that allows each device to be separately addressable.

With reference now to FIG. 6, shown is a schematic view illustrating a communications packet 101 transported by the modem 50 of FIG. 3. Packet 101 is a standard frame relay communication packet. Begin flag 102 signals the start of the packet. Frame 103 is the address header and is depicted as two octets. An octet is an eight bit word. Frame 103 can be a length of two to four octets, however, for simplicity is shown as two octets in this preferred embodiment. Following frame 103 is information frame 104 which contains the user data to be transported over the network, and any proprietary header information required. Information frame 104 is variable in length depending upon the information to be transported. Following information frame 104 is frame check sequence (FCS) frame 105. The FCS frame is typically two octets in length and is typically a cyclical redundancy check (CRC) error detection code used to ensure the integrity of the transported information. Finally, frame 106 contains the one octet end flag used to signal the end of the packet.

Figure 7:
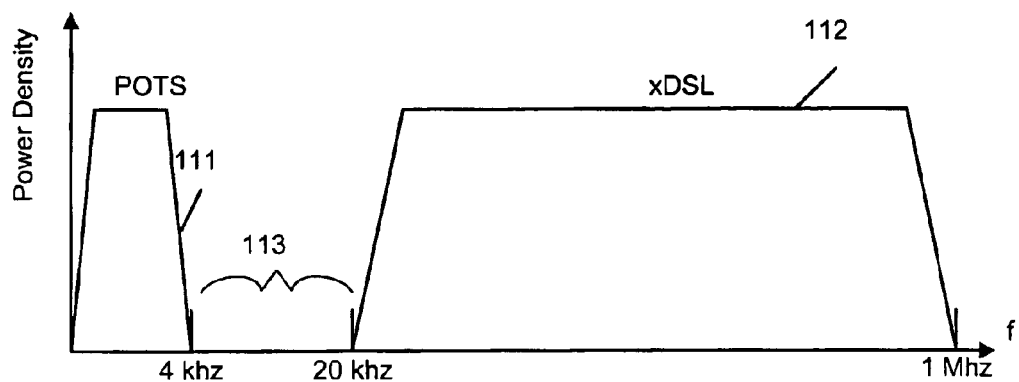
FIG. 7 is a block diagram of the frequency spectrums utilized by the multipoint protocol packets of FIG. 6.

Turning now to the drawings, FIG. 7 is a diagram illustrating frequency band communications. The terminology "frequency band communications" is used here to indicate communications of information within a certain defined, frequency band. As is known in the prior art, POTS communications are transmitted in the frequency band 111 defined between about 0 Hz (DC) and about 4 kHz. A second transmission frequency band 112 is defined at a higher frequency level than the POTS frequency band 111, and is used in the transmission of digital subscriber line (DSL) communications. A guard band 113 is required to separate the two transmission frequency bands 111 and 112. The DSL transmission frequency band 112 is more broadly denominated as "xDSL", wherein the "x" generically denominates any of a number of transmission techniques within the DSL family. For example, ADSL—asymmetric digital subscriber line, RADSL—rate adaptive digital subscriber line, HDSL—high-bit-rate DSL, etc. As is known, xDSL transmission frequency bands may encompass a bandwidth of greater than about 1 MHz. As a result, and for the reasons described above, without the addition of extra equipment, such as POTS filters, splitters, etc. The xDSL signals are not compatible with attached POTS-type equipment, such as telephones, PSTN modems, facsimile machines, etc.

As will be discussed in more detail below, alternative embodiment of the present invention provides an upper transmission band having an upper frequency boundary that is much lower than the 1 MHz frequency boundary often encountered in xDSL transmissions. Indeed, the upper frequency boundary of the present invention is defined in a range that is readily supported by, or compatible with, transmission systems (and attached POTS-type equipment) presently in place between a customer premises and a central office, without the need for extraneous devices such as POTS filters and POTS splitters.

In accordance with one aspect of the invention, a multichannel data communication device (modem 50) is provided for achieving efficient data communications between a customer premises 41 and a central office 11 across a local loop 27, by dynamically allocating a transmission frequency bandwidth for transmitting data. Certainly, one of the factors motivating the development of the present invention is the expanded demand for higher speed communications in recent years. This enhanced demand is primarily attributed to communications over the Internet.

Figure 9:
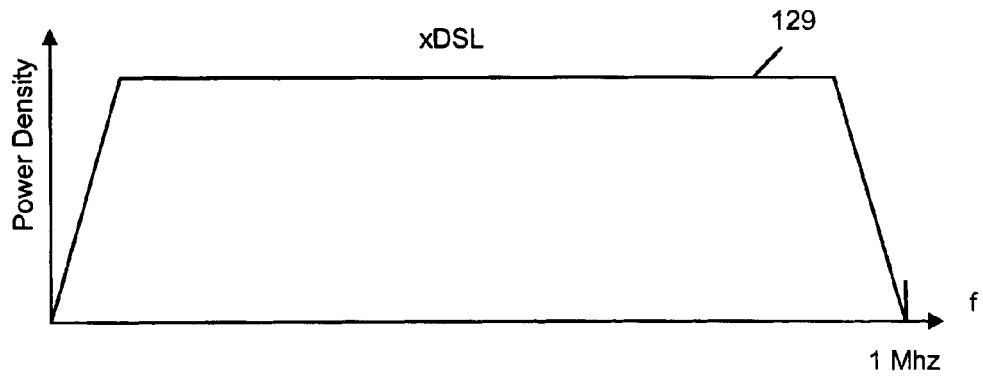
FIG. 9 is a block diagram of the Frequency spectrum utilized by the multipoint protocol packets of FIG. 5, when not currently utilizing POTS devices.

The present invention dynamically allocates a data transmission frequency band (PSD) in response to POTS communications across the same line. More particularly, the present invention may utilize the frequency band otherwise allocated for POTS/voice transmission, at times when there is no present demand for transmitting voice information as illustrated in FIG. 9. When, however, there is a demand for voice transmissions, then the present invention reallocates the transmission frequency band for the data communications so that there is no overlap or interference with the POTS transmission frequency band 111, and so that there is not significant interference to POTS type attached equipment.

Figure 8:
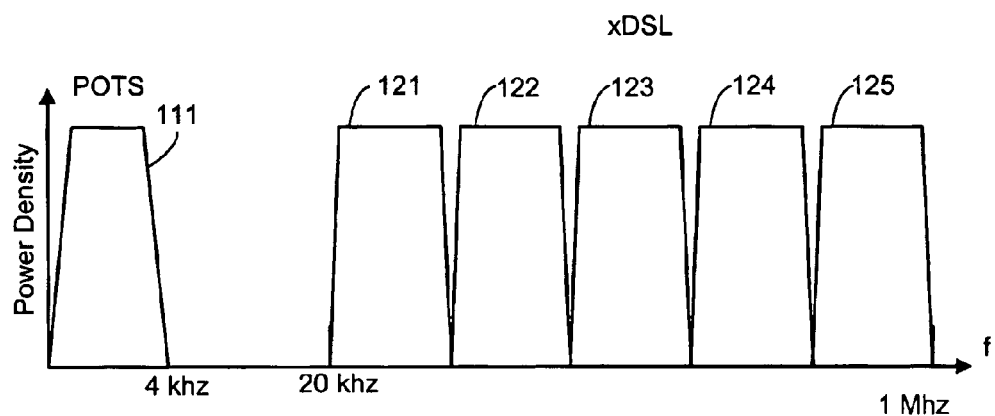
FIG. 8 is a block diagram of the frequency spectrums utilized by the frequency division multiplexing method that provides each device with a separately addressable access.

Illustrated in FIG. 8 is the alternative embodiment of the present invention that achieves simultaneous multiple telephone type services on a single wire pair by utilizing the frequency division multiplexing method. Frequency division multiplexing assigns an available frequency range, within the band with the communication medium, for each device that is separately addressable. As shown in FIG. 8, the POTS devices of the prior art telephone 44, standard fax machine 42, and the like, establish communications on a frequency range between 0 kHz and about 4 kHz as shown as item 111. A second transmission frequency range defined at a higher frequency level 121 provides simultaneous multiple access for a service device. Each available frequency range within the bandwidth of the communication medium can be assigned to a particular service type. While FIG. 8 illustrates five frequency ranges 121 through 125, the invention can utilize two or more frequency ranges between 20 kHz and 1 MHz.

Referring now to FIG. 10, illustrated is the routine that initializes and processes the address determination logic within the DSP, CPU or ASIC 71 (FIG. 4). Initialization of the address determination routine of the DSP, CPU or ASIC occurs at step 131. This initialization step loads startup routines for the address determination logic. It is then determined if the address by the DSP, CPU or ASIC determination logic is performed by utilizing a multipoint protocol, which provides each device with a unique device ID that is uniquely and separately addressable, or if the address determination logic uses frequency division multiplexing, that is accomplished by assigning frequency ranges to each unique service device at step 132. If it is determined at step 132 that a multipoint protocol with unique device addresses is being utilized, then step 134 sets the address determination logic to multipoint DSL and assigns the unique device IDs to the available service devices. If it is determined at step 132, that frequency division multiplexing is to be utilized, then each service device is assigned a unique frequency range at step 133. Step 135 starts processing communications for each of the assigned service devices. Processing continues until the service device is separated from the network and the address determination logic is exited at step 139.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A data communications apparatus for enabling a plurality of telephone-type services to be provided to a plurality of telephone-type devices connected to a single subscriber line, said apparatus comprising:

circuitry connectable to at least one of said plurality of telephone-type devices wherein said circuitry enables said at least one of said plurality of telephone-type devices to operate using a frequency band higher than a plain old telephone system (POTS) frequency band on the subscriber line; and interface circuitry attachable to said single subscriber line to enable said at least one of said plurality of telephone-type devices using said frequency band higher than said POTS frequency band to simultaneously share said single subscriber line with another one of said plurality of telephone-type devices that uses the POTS frequency band;

wherein said plurality of telephone-type services comprises at least one of a video phone service, a digital phone service with a protocol utilized for communication over the Internet, a digital facsimile service, an audio service utilizing audio compression, a digitized audio service, an audio and visual data streaming service, a multimedia service, a home security service, and a meter reading service, wherein the real-time services are serviced in a timely manner using polling.

2. The data communications apparatus of claim 1, further comprising means for providing said plurality of telephone-type services concurrently.

3. The data communications apparatus of claim 1, wherein the plurality of telephone-type services are provided by a central office, the central office comprising:

a POTS splitter electrically connected to the subscriber line, the POTS splitter transmitting a first signal onto the subscriber line and receiving a second signal from the subscriber line;

a POTS switch connected to the POTS splitter; and a multipoint master modem connected to the POTS splitter;

wherein one of the first and second signals comprises one of an analog POTS signal and at least one digital signal, the analog POTS signal having a POTS data within the POTS frequency band, the at least one digital signal having digital data within the frequency band higher than the POTS frequency band; and wherein the other of the first and second signals comprises at least one digital signal within the frequency band higher than the POTS frequency band.

4. The data communications apparatus of claim 1, wherein the plurality of telephone-type services are performed at a customer premises, the customer premises comprising said subscriber line and said plurality of telephone-type devices, the telephone-type devices comprising at least one POTS device that transmits and receives analog POTS signals along the subscriber line, the telephone-type devices further comprising at least one digital device that transmits and receives digital signals along the subscriber line;

wherein the analog POTS signals comprise voice data within a first frequency band ranging from 0 to 4 kHz, and the digital signals comprise digital data within a second frequency band ranging from 20 kHz to 1 MHz, the first and second frequency bands separated by a guard frequency band ranging from 4 kHz to 20 kHz.

5. The data communications apparatus of claim 1, wherein at least one of the plurality of telephone-type devices using the frequency band higher than the POTS frequency band is a digitized analog communications device.

6. The data communications apparatus of claim 1, wherein the plurality of telephone-type services comprises at least one of an audio service utilizing audio compression, a digitized audio service, a DSL service, a multimedia service, a video phone service, a digital telephone service including a protocol for communication over the Internet, a digital facsimile service, an audio and visual data streaming service, a home security service, a utility meter reading service, a digital telephone service, a personal computer service, an Internet video telephone service, and a digital television service.

7. The data communications apparatus of claim 1, wherein at least one of the telephone-type devices using the frequency band higher than the POTS frequency band has a transfer rate that is higher than that associated with at least one of the plurality of telephone-type devices that uses the POTS frequency band.

8. The data communications apparatus of claim 1, wherein at least one of the telephone-type devices that uses the POTS frequency band is designed to communicate a voice signal, and at least one of the telephone-type devices that uses the frequency band higher than the POTS frequency band is designed to communicate a data signal.

9. The data communications apparatus of claim 1, further comprising means for transmitting communication signals along the subscriber line, the communication signals comprising:

an analog POTS signal within the POTS frequency band, the POTS frequency band comprising a range of frequencies for carrying POTS signals; and at least one digital signal within the frequency band higher than the POTS frequency band, the frequency band higher than the POTS frequency band comprising a range of frequencies for carrying digital signals;

wherein the analog POTS signal and the digital signal exist on the subscriber line simultaneously, the telephone-type devices comprising at least one POTS device that transmits or receives the analog POTS signal and at least one digital device that transmits or receives the digital signal.

10. The data communications apparatus of claim 9, wherein the at least one digital device operates in both the POTS frequency band and the frequency band higher than the POTS frequency band when the at least one POTS device is not in operation.

11. The data communications apparatus of claim 9, wherein the POTS frequency band comprises frequencies within a range from 0 to 4 kHz, the frequency band higher than the POTS frequency band comprises frequencies within a range from 20 kHz to 1 MHz, and a guard frequency band comprises frequencies within a range from 4 kHz to 20 kHz.

12. The data communications apparatus of claim 9, wherein the at least one digital signal comprises a plurality of digital signals, each digital signal transmitted along the subscriber line within a frequency range that is a sub-set of the frequency band higher than the POTS frequency band, each sub-set being separate from the sub-sets of the other digital signals.

13. The data communications apparatus of claim 12, wherein the subscriber line is connected to a plurality of digital devices, each digital device configured to transmit and receive digital signals within the respective frequency band sub-set.

14. The data communications apparatus of claim 9, wherein the analog POTS signal is transmitted along the subscriber line in one direction and the digital signal is simultaneously transmitted along the subscriber line in the opposite direction.

15. The data communications apparatus of claim 1, herein the data communication apparatus is configured within a communication system, the communication system comprising:

a subscriber premises having said subscriber line connected to a plurality of subscriber devices, the subscriber devices comprising at least one POTS device that transmits and receives an analog POTS signal and at least one digital device that transmits and receives a digital signal; and a central office wire center comprising a POTS splitter, a POTS switch, and a multipoint master modem, the POTS splitter connected to the subscriber line of the subscriber premises and further connected to the POTS switch and multipoint master modem of the central office wire center;

wherein a communication signal is communicated between the POTS splitter and the subscriber devices along the subscriber line, the communication signal comprising the analog POTS signal within a first frequency range and the digital signal within a second frequency range, the second frequency range comprising frequencies higher than the frequencies in the first frequency range.

16. The data communications apparatus of claim 15, wherein the analog POTS signal is communicated between the POTS splitter and POTS switch, and the digital signal is communicated between the POTS splitter and the multipoint master modem.

17. The data communications apparatus of claim 1, wherein the single subscriber line is a single wire pair.

18. The data communications apparatus of claim 1, wherein the plurality of telephone-type devices that uses the POTS frequency band communicates directly with the subscriber line without the use of a modem.

19. The data communications apparatus of claim 1, wherein the plurality of telephone-type devices comprises at least one device from a list comprising telephones and facsimile machines.

20. The data communications apparatus of claim 1, further comprising a modem, wherein the plurality of telephone-type devices using the frequency band higher than the POTS frequency band communicates with the subscriber line via the modem.

21. The data communications apparatus of claim 1, wherein the subscriber line allows simultaneous transmission of analog POTS signals and digital signals.

22. A method for use in a data communications apparatus, said method comprising:

providing a plurality of telephone-type services to a plurality of telephone-type devices connected to a single subscriber line of said data communications apparatus, at least one of said plurality of telephone-type devices operating within a frequency band higher than a plain old telephone system (POTS) frequency band; and enabling said at least one of said plurality of telephone-type devices to operate within said frequency band higher than said POTS frequency band and to simultaneously share said single subscriber line with another one of said plurality of telephone-type devices that uses the POTS frequency band;

wherein providing a plurality of telephone-type services comprises providing at least one of a video phone service, a digital phone service with a protocol utilized for communication over the Internet, a digital facsimile service, an audio service utilizing audio compression, a digitized audio service, an audio and visual data streaming service, a multimedia service, a home security service, and a meter reading service, wherein the real-time services are serviced in a timely manner using polling.

23. The method of claim 22, wherein providing said plurality of telephone-type services further comprises providing said plurality of telephone-type services concurrently.

24. The method of claim 22, wherein the plurality of telephone-type services are provided by a central office, the central office comprising:
a POTS splitter electrically connected to the subscriber line, the POTS splitter transmitting a first signal onto the subscriber line and receiving a second signal from the subscriber line;
a POTS switch connected to the POTS splitter; and
a multipoint master modem connected to the POTS splitter;
wherein one of the first and second signals comprises one of an analog POTS signal and at least one digital signal, the analog POTS signal having POTS data within the POTS frequency band, the at least one digital signal having digital data within the frequency band higher than the POTS frequency band; and
wherein the other of the first and second signals comprises at least one digital signal within the frequency band higher than the POTS frequency band.

25. The method of claim 22, wherein providing said plurality of telephone-type services further comprises providing the plurality of telephone-type services at a customer premises, the customer premises comprising:
said single subscriber line, the single subscriber line being in electrical communication with a central office of a communication system; and
said plurality of telephone-type devices, the telephone-type devices comprising at least one POTS device that transmits and receives analog POTS signals along the subscriber line, the telephone-type devices further comprising at least one digital device that transmits and receives digital signals along the subscriber line;
wherein the analog POTS signals comprise signals within a first frequency band comprising frequencies within a range from 0 to 4 kHz, and the digital signals comprise digital data within a second frequency band comprising frequencies within a range from 20 kHz to 1 MHz, whereby the first and second frequency bands are separated by a guard frequency band comprising frequencies within a range from 4 kHz to 20 kHz.

26. The method of claim 22, further comprising:
communicating a data signal in the frequency band that is higher than the POTS frequency band; and
communicating a voice signal in the POTS frequency band.

27. The method of claim 22, wherein at least one of the plurality of telephone-type devices using the frequency band higher than the POTS frequency band is a digitized analog communications device.

28. The method of claim 22, wherein providing the plurality of telephone-type services comprises providing at least one of an audio service utilizing audio compression, a digitized audio service, a DSL service, a multimedia service, a video phone service, a digital telephone service including a protocol for communication over the Internet, a digital facsimile service, an audio and visual data streaming service, a home security service, a utility meter reading service, a digital telephone service, a personal computer service, an Internet video telephone service, and a digital television service.

29. The method of claim 22, further comprising:
communicating a voice signal via one of the telephone-type devices that uses the POTS frequency band; and
communicating a data signal via one of the telephone-type devices that uses the frequency band higher than the POTS frequency band.

30. The method of claim 22, further comprising:
simultaneously transmitting multiple communication signals along the subscriber line, the communication signals comprising:
an analog POTS signal within the POTS frequency band; and
at least one digital signal within the frequency band higher than the POTS frequency band.

31. The method of claim 30, wherein the POTS frequency band comprises frequencies within a range from 0 to 4 kHz, the frequency band higher than the POTS frequency band comprises frequencies within a range from 20 kHz to 1 MHz, and a guard frequency band comprises frequencies within a range from 4 kHz to 20 kHz.

32. The method of claim 30, wherein the telephone-type devices comprise at least one POTS device that transmits or receives the analog POTS signal and at least one digital device that transmits or receives the digital signal.

33. The method of claim 32, wherein the at least one digital device operates in both the POTS frequency band and the frequency band higher than the POTS frequency band when the at least one POTS device is not in operation.

34. The method of claim 32, wherein the at least one digital signal comprises a plurality of digital signals, the method further comprising:
transmitting each digital signal along the subscriber line within a frequency range that is a sub-set of the frequency band higher than the POTS frequency band, each sub-set being separate from the sub-sets of the other digital signals.

35. The method of claim 34, further comprising:
enabling each digital device to transmit or receive one of the plurality of digital signals to or from the subscriber line within the respective frequency band sub-set.

36. The method of claim 32, further comprising:
transmitting the analog POTS signal along the subscriber line in one direction; and
simultaneously transmitting the at least one digital signal along the subscriber line in the opposite direction.

37. The method of claim 22, wherein the single subscriber line is a single wire pair.

38. The method of claim 22, further comprising:
enabling the telephone-type device that uses the POTS frequency band to communicate directly with the subscriber line without the use of a modem.

39. The method of claim 38, wherein the telephone-type device comprises one device from a list comprising telephones and facsimile machines.

40. The method of claim 22, further comprising:
enabling the at least one telephone-type device using the frequency band higher than the POTS frequency band to communicate with the subscriber line via a modem.

41. The method of claim 22, further comprising:
enabling at least one of the plurality of telephone-type devices to communicate with the subscriber line via a wireless connection.

42. The method of claim 22, wherein the subscriber line allows simultaneous transmission of analog POTS signals and digital signals.

43. A system comprising:
a subscriber line;
a first telephone-type device designed to communicate within a plain old telephone system (POTS) frequency band, the first telephone-type device connected to the subscriber line;
a second telephone-type device designed to communicate within a frequency band that is higher than the POTS frequency band, the second telephone-type device implementing at least one of an audio service that utilizes audio compression, a DSL service, a multimedia service, a video phone service, a digital phone service including a protocol for communication over the Internet, a digital facsimile service, an audio and visual data streaming service, a home security service, and a meter reading system service including real-time devices that are serviced in a timely manner using polling; and
interface circuitry that interfaces the second telephone type-device to the subscriber line and enables the second telephone-type device to communicate within a frequency band that is higher than the POTS frequency band.

44. The system of claim 43, further comprising means for enabling the first telephone-type device and second telephone-type device to operate concurrently.

45. The system of claim 43, further comprising a central office for providing a plurality of telephone-type services, the central office comprising:
a POTS splitter electrically connected to the subscriber line, the POTS splitter transmitting a first signal onto the subscriber line and receiving a second signal from the subscriber line;
a POTS switch connected to the POTS splitter; and
wherein one of the first and second signals comprises one of an analog POTS signal and at least one digital signal, the analog POTS signal having data within the POTS frequency band, the at least one digital signal having digital data within the frequency band higher than the POTS frequency band; and
wherein the other of the first and second signals comprises at least one digital signal within the frequency band higher than the POTS frequency band.

46. The system of claim 45, further comprising a customer premises, wherein the customer premises comprises:
said subscriber line, the subscriber line being in electrical communication with the central office; and
said first telephone-type device, the first telephone-type device comprising a POTS device that transmits and receives analog POTS signals along the subscriber line; and
said second telephone-type device, the second telephone-type device comprising a digital device that transmits and receives digital signals along the subscriber line;
wherein the POTS frequency band comprises frequencies within a range from 0 to 4 kHz, and the frequency band that is higher than the POTS frequency band comprises frequencies within a range from 20 kHz to 1 MHz, whereby the frequency bands are separated by a guard frequency band comprising frequencies within a range from 4 kHz to 20 kHz.

47. The system of claim 43, further comprising means for providing a first telephone-type service to the first telephone-type device and providing a second telephone-type service to the second telephone-type device, each telephone-type service being determinable by a telephone service provider.

48. The system of claim 43, wherein the second telephone-type device is a digitized analog communications device.

49. The system of claim 43, the second telephone-type device implements one of an audio service utilizing audio compression, a digitized audio service, a DSL service, a multimedia service, a video phone service, a digital telephone service including a protocol for communication over the Internet, a digital facsimile service, an audio and visual data streaming service, a home security service, a utility meter reading service, a digital telephone service, a personal computer service, an Internet video telephone service, and a digital television service.

50. The system of claim 43, wherein the second telephone-type device has a transfer rate that is higher than the transfer rate associated with the first telephone-type device.

51. The system of claim 43, wherein the first telephone-type device is designed to communicate an analog voice signal, and the second telephone-type device is designed to communicate a digital data signal.

52. The system of claim 43, further comprising means for transmitting communication signals along the subscriber line, the communication signals comprising:
an analog POTS signal within the POTS frequency band, the POTS frequency band comprising a range of frequencies for carrying POTS signals; and
at least one digital signal within the frequency band that is higher than the POTS frequency band, the frequency band higher than the POTS frequency band comprising a range of frequencies for carrying digital signals;
wherein the analog POTS signal and the at least one digital signal exist on the subscriber line simultaneously, the telephone-type devices comprising at least one POTS device that transmits or receives the analog POTS signal and at least one digital device that transmits or receives the digital signal.

53. The system of claim 52, wherein the at least one digital device operates in both the POTS frequency band and the frequency band that is higher than the POTS frequency band when the at least one POTS device is not in operation.

54. The system of claim 52, wherein the POTS frequency band comprises frequencies within a range from 0 to 4 kHz, the frequency band higher than the POTS frequency band comprises frequencies within a range from 20 kHz to 1 MHz, and a guard frequency band comprises frequencies within a range from 4 kHz to 20 kHz.

55. The system of claim 52, wherein the at least one digital signal comprises a plurality of digital signals, each digital signal transmitted along the subscriber line within a frequency range that is a sub-set of the frequency band higher than the POTS frequency band, each sub-set being separate from the sub-sets of the other digital signals.

56. The system of claim 55, wherein the subscriber line is connected to a plurality of digital devices, each digital device configured to transmit and receive one of the plurality of digital signals.

57. The system of claim 52, wherein the analog POTS signal is transmitted along the subscriber line in one direction and the digital signal is simultaneously transmitted along the subscriber line in the opposite direction.

58. The system of claim 43, further comprising:
a subscriber premises having said subscriber line connected to a plurality of subscriber devices, the subscriber devices comprising at least one POTS device that transmits or receives analog POTS signals and at least one digital device that transmits or receives digital signals, the at least one digital device comprising at least one real-time device that is serviced in a timely manner; and a central office wire center comprising a POTS splitter, a POTS switch, and a multi-point master modem, the POTS splitter connected to the subscriber line of the subscriber premises and further connected to the POTS switch and multi-point master modem of the central office wire center;

wherein a communication signal is communicated between the POTS splitter and the subscriber devices along the subscriber line, the communication signal comprising the analog POTS signal within a first frequency range and the digital signal within a second frequency range, the second frequency range comprising frequencies higher than the frequencies in the first frequency range.

59. The system of claim 58, further comprising:
means for communicating the analog POTS signal between the POTS splitter and POTS switch; and
means for communicating the digital signal between the POTS splitter and the multi-point master modem.

60. The system of claim 43, herein the subscriber line is a single wire pair.

61. The system of claim 43, wherein the first telephone-type device communicates directly with the subscriber line without the use of a modem.

62. The system of claim 61, wherein the first telephone-type device comprises at least one device from a list comprising telephones and facsimile machines.

63. The system of claim 43, further comprising a modem, wherein the second telephone-type device communicates with the subscriber line via the modem.

* * * * *

UNITED STATES PATENT AND TRADEMARK OFFICE
CERTIFICATE OF CORRECTION

| | | |
|---|---|---|
| PATENT NO. | : 7,020,266 B2 | Page 1 of 3 |
| APPLICATION NO. | : 10/269209 | |
| DATED | : March 28, 2006 | |
| INVENTOR(S) | : Bremer et al. | |

It is certified that error appears in the above-identified patent and that said Letters Patent is hereby corrected as shown below:

On the title page, item [56] insert the following:

| | | | |
|---|---|---|---|
| 5,768,279 | 6/1998 | Barn et al. | 370/486 |
| 5,812,786 | 9/1998 | Seazholtz et al. | 95/200.63 |
| 6,081,530 | 6/2000 | Wiher et al. | 370/395 |
| 6,246,695 | 6/2001 | Seazholtz et al. | 370/468 |

On the face of the patent (and continuing onto p. 2 of the face), insert the following under "OTHER PUBLICATIONS" of the References Cited section:

"Simulation and Experimental Studies on the Concept of a Rate-Adaptive Digital Subscriber Loop (RA-DSL)", Wayne D. Grover, Senior Member, IEEE, Witold A. Krzymien, Member, IEEE and A. Shen, IEEE Journal On Selected Areas In Communication, vol. 9, no. 6, August 1991, pages 941-950.

"Multiple Virtual Modem Marketing Guide," Guide for 3455 MVM, Paradyne, February 1988, Pages 1-1 through 5-1.

"for Telecommunications - Integrated Services Digital Network (ISDN)-Basic Access Interface for Use on Metallic Loops for Application on the Network Side of the NT (Layer 1 Specification)", American National Standards Institute, ANSI TI.601-1992.

"Coding Rapporteur's Report," Amati Communications Corporation, John M. Cioffi, T1E1.4:ADSL, T1E1.4/93-247, October 4, 1993.

"Recommended Reveille Sequence for DMT ADSL," Amati Communications Corporation, Jack S. Chow, T1E1.4:ADSL, T1E1.4/93-114, May 10, 1993.

"Recommended CRC and Message Subsections of the Exchange for DMT ADSL," Amati Communications Corporation, Jacky S. Chow, Ronald R. Hunt and John M. Cioffi, T1E1.4:ADSL, T1E1.4/93-115, May 10, 1993.

"Revised Data Framing & Synchronization Conventions for DMT ADSL," Amati Communications Corporation, J.M. Cioffi, P.T. Tong, J.T. Aslanis and A.H. Gooch, T1E1.4: ADSL, T1E1.4/93-119R1, August 23, 1993.

(*Continued on Page 2*)

UNITED STATES PATENT AND TRADEMARK OFFICE
CERTIFICATE OF CORRECTION

| | |
|---|---|
| PATENT NO. | : 7,020,266 B2 |
| APPLICATION NO. | : 10/269209 |
| DATED | : March 28, 2006 |
| INVENTOR(S) | : Bremer et al. |

It is certified that error appears in the above-identified patent and that said Letters Patent is hereby corrected as shown below:

"Revised Data Framing & Synchronization Conventions for DMT ADSL," Amati Communications Corporation, A.H. Gooch, J.M. Cioffi, and J.T. Aslanis, T1E1.4: ADSL, T1E1.4/93-119R2, October 4, 1993.

"Discussion of Default Rate Negotiation," Amati Communications Corporation, John M. Cioffi, T1E1.4: ADSL, T1E1.4/93-314, November 15, 1993.

"Revised Data Framing & Synchronization Conventions for DMT ADSL," Amati Communications Corporation, J.M. Cioffi, P.T. Tong and A.H. Gooch, T1E1.4: ADSL, T1E1.4/93-119, May 10,1993.

"Discussion of Default Rate Negotiation," Amati Communications Corporation, John M. Cioffi, T1E1.4: ADSL, T1E1.4/93-314, November 15, 1993.

"Asymmetric Duplex Rates for ATM," Ken Hohhof, High Rate DSL-ADSL, Westell, T1E1.4 Technical Subcommittee Working Group Members, December 5, 1994.

"Revised Activation, Acknowledge, & Rate Negotiation for DMT ADSL," Amati Communications Corporation, John M. Cioffi & Jacky S. Chow, T1E1.4; ADSL, T1E1.4/93- 113R1, August 23, 1993.

"Recommended Activation, Acknowledge, & Rate Negotiation for DMT ADSL," Amati Communications Corporation, John M. Cioffi & Jacky S. Chow, T1E1.4: ADSL, T1E1.4/93-113, May 10, 1993.

"A Technical Report on High-Bit-Rate Digital Subscriber Lines (HDSL)," T1E1.4 Working Group on Digital Subscriber Lines, Committee T1-Telecommunications, Report No. 28, February 1994.

Internal Memorandum, "Adaptive Variable Rate Modem - Product Overview," Massimo Sorbara, Org. 140330000, MT 3P-216, x73933, AT&T Bell Laboratories, September 6, 1994.

"The ISDN Subscriber Loop," Nick Burd, National Semiconductor GmbH, Fürstenfeldbruck, Germany, 1997.

*Continued on page 3*

UNITED STATES PATENT AND TRADEMARK OFFICE
CERTIFICATE OF CORRECTION

PATENT NO. : 7,020,066 B2
APPLICATION NO. : 10/269209
DATED : March 28, 2006
INVENTOR(S) : Bremer et al.

It is certified that error appears in the above-identified patent and that said Letters Patent is hereby corrected as shown below:

"Understanding Digital Subscriber Line Technology," Thomas Starr, Senior MTS, Ameritech, John M.Cioffi, Professor of Electrical Engineering, Stanford University, Peter Silverman, Senior Architect - New Business Initiatives, 3COM Corporation, 1999.

Kraimeche, B.; Integration of VBR video and ABR data sources at a SDL-based access node; Oct. 11-13, 1999; Pages 568-573; IEEE Xplore Citation.

Nedev, Nedko; McLaughlin, Stephen; Laurenson, David; and Daley, Robert; ATM Cell Error Performance of xDSL under Impulse Noise; June 11-14 2001; Pages 1254-1258 vol.4; IEEE Xplore Citation.

Samosir, Benny Henricus; PT TELKOM Results on Field Tests of Asymmetric Digital Subscriber Line - Lite Technology via ATM Networks; April 22-25, 2001; Pages 227-230; IEEE Xplore Citation.

In col. 5, line 56, delete "master point modem: and insert --multipoint master modem-- therefor.

In col. 12, line 51, delete "of claim 1" and insert --of claim 18-- therefor.

Signed and Sealed this

Thirty-first Day of October, 2006

JON W. DUDAS
*Director of the United States Patent and Trademark Office*

UNITED STATES PATENT AND TRADEMARK OFFICE
CERTIFICATE OF CORRECTION

PATENT NO. : 7,020,266 B2  Page 1 of 1
APPLICATION NO. : 10/269209
DATED : March 28, 2006
INVENTOR(S) : Bremer et al.

It is certified that error appears in the above-identified patent and that said Letters Patent is hereby corrected as shown below:

In col. 10, lines 36-37, please delete "the real-time services" and insert therefor -- said plurality of telephone-type services includes real-time services that --.

In col. 13, line 12, after "comprises providing", please insert --real-time services including--.

Signed and Sealed this

Twenty-sixth Day of December, 2006

JON W. DUDAS
*Director of the United States Patent and Trademark Office*